(12) United States Patent
Regli et al.

(10) Patent No.: US 7,761,265 B2
(45) Date of Patent: Jul. 20, 2010

(54) METHOD FOR COMPARING SOLID MODELS

(75) Inventors: William C. Regli, Philadelphia, PA (US); Vincent A. Cicirello, Pittsburgh, PA (US)

(73) Assignee: Drexel University, Philadelphia, PA (US)

( * ) Notice: Subject to any disclaimer, the term of this patent is extended or adjusted under 35 U.S.C. 154(b) by 991 days.

(21) Appl. No.: 10/430,046

(22) Filed: May 6, 2003

(65) Prior Publication Data

US 2003/0208285 A1 Nov. 6, 2003

Related U.S. Application Data

(60) Provisional application No. 60/380,109, filed on May 6, 2002.

(51) Int. Cl.
G06F 17/50 (2006.01)
G06F 7/60 (2006.01)
G06F 17/10 (2006.01)

(52) U.S. Cl. .............................................. 703/2; 703/1
(58) Field of Classification Search ...................... 703/2, 703/1; 702/127; 345/418–420, 441; 715/964
See application file for complete search history.

(56) References Cited

U.S. PATENT DOCUMENTS

| | | | | |
|---|---|---|---|---|
| 5,323,333 | A * | 6/1994 | Johnson | 703/1 |
| 6,363,298 | B1 * | 3/2002 | Shin et al. | 700/160 |
| 6,512,995 | B2 * | 1/2003 | Murao | 702/167 |
| 7,133,041 | B2 * | 11/2006 | Kaufman et al. | 345/419 |

OTHER PUBLICATIONS

Vincent A. Cicirello, Jun. 1999, "Intelligent Retrieval of Solid Models", Drexel University, 84 pages.*
J. R. Ullmann, "An Algorithm for Subgraph Isomorphism" Journal of the Association for Computing Machinery, vol. 23, No. 1, Jan. 1976, pp. 31-42.*
Ciaccia et al., "M-tree: an efficient access method for similarity search in metric spaces," Proceedings of the 23rd VLDB Conference, Athens, Greece, pp. 426-435 (1997).
Cicirello et al., "Resolving non-uniqueness in design feature histories," Drexel University publication, 9 pages (1999).
De Floriani, L., "Feature extraction from boundary models of three-dimensional objects," IEEE Transactions on Pattern Analysis and Machine Intelligence 11(8):785-798 (1989).

(Continued)

*Primary Examiner*—Dwin M Craig
(74) *Attorney, Agent, or Firm*—Knoble, Yoshida & Dunleavy, LLC

(57) ABSTRACT

A method for determining a similarity of a first solid model to a second solid model is disclosed. The method includes the steps of: selecting a set of features for representing the first solid model; extracting features corresponding to the selected set of features from the first solid model; constructing an undirected model dependency graph of the first solid model based on the selected set of features; extracting features corresponding to the selected set of features from the second solid model; constructing an undirected model dependency graph of the second solid model based on the selected set of features; comparing the undirected model dependency graph of the first solid model with the undirected model dependency graph of the second solid model; and outputting a numerical measure indicative of the similarity of the first solid model to the second solid model.

23 Claims, 8 Drawing Sheets

OTHER PUBLICATIONS

Elinson et al., "Feature-based similarity assessment of solid models," ACM/SIGGRAPH Symp. on Solid Modeling and Applications, 14 pages (1997).

Han et al., "Manufacturing feature recognition from solid models: a status report," IEEE Transactions on Robotics and Automation 16(6):782-783, 786-796 (2000).

Joshi et al., "Graph-based heuristics for recognition of machined features from a 3D solid model," Computer-Aided Design 20(2):58-66 (1988).

Marefat et al., "Geometric reasoning for recognition of three-dimensional object features," IEEE Transactions on Pattern Analysis and Machine Intelligence 12(10):949-965 (1990).

Regli et al., "A repository for design, process planning and assembly," Computer-Aided Design 29(12):895-905 (1997).

Regli et al., "What are feature interactions?," Proceedings of The 1996 ASME Design Engineering Technical Conference and Computers in Engineering Conference Aug. 18-22, 1996, Irvine, California (1996).

Sun et al., "Shape similarity assessment of mechanical parts based on solid models," Design Engineering Technical Conferences 83(2):953-962 (1995).

Ullmann, J.R., "An algorithm for subgraph isomorphism," J.Assoc. for Computing Machinery 23(1):31-42 (1976).

Vandenbrande et al., "Spatial reasoning for the automatic recognition of machinable features in solid models," IEEE Transactions on Pattern Analysis and Machine Intelligence 15(12:1269-1285 (1993).

Wu, J., "Content-based indexing of multimedia databases," IEEE Transactions on Knowledge and Data Engineering 9(6):978-989 (1997).

Han et al., "Manufacturing Feature Recognition from Solid Models: A Status Report" IEEE Transactions on Robotics and Automation, 2000, 31 pages.

Cicirello et al., "Machining Feature-based Comparisons of Mechanical Parts" In International Conference on Shape Modeling and Applications, pp. 176-187. ACM SIGGRAPH, the Computer Graphics Society and EUROGRAPHICS, IEEE Computer, 2001, 10 pages.

* cited by examiner

Input: $G_1 = (V_1, E_1)$, $G_2 = (V_2, E_2)$, the two graphs being tested.
Output: true if the graphs are found to be isomorphic or false otherwise.
ULLMANN($G_1$, $G_2$)

(1)  M = INITULLMANN ($G_1$, $G_2$)
(2)  if REFINE($M$, $G_1$, $G_2$) = 0
(3)      return false
(4)  else
(5)      $N$ = SORT($V_1$)
(6)      return ULLMANNDFS($M$, $G_1$, $G_2$, $N$, LENGTH(N)-1)

FIG. 4

Input: $G_1 = (V_1, E_1)$, $G_2 = (V_2, E_2)$, the two graphs being tested. $M$ is the mapping matrix $M$ previously described. $N$ is a sorted list of the nodes of the smaller graph $G_1$. *Level* is the current level of the DFS.
Output: true if the graphs are found to be isomorphic or false otherwise.
ULLMANNDFS ($M$, $G_1$, $G_2$, $N$, *Level*)

(1)  forall $v_2$ in $V_2$ do
(2)      if $M[N[Level], v_2] = 1$
(3)          Mnew = BIND($N[Level]$, $M$, $v_2$)
(4)          if REFINE($M$ new, $G_1$, $G_2$) = 0
(5)              DO NOTHING
(6)          else
(7)              if *Level* = 0
(8)                  return true
(9)              else
(10)                 if ULLMANNDFS($M$ new, $G_1$, $G_2$, $N$, *Level*-1) = true
(11)                     return true
(12) return false

FIG. 5

Input: $G_1 = (V_1, E_1)$, $G_2 = (V_2, E_2)$, the two graphs being tested.
Output: true if the graphs are found to be isomorphic or false otherwise.
GSIC($G_1$, $G_2$)

(1)     M = INITGSIC($G_1$, $G_2$)
(2)     if REFINE2($M$, $G_1$, $G_2$, $H$) = 0
(3)         return false
(4)     else
(5)         if LENGTH(H) = 0
(6)             return true
(7)         else
(8)             $H$ = SORT($H$)
(9)             return DFSGSIC($M$, $G_1$, $G_2$, $H$)

FIG. 6

Input: $G_1 = (V_1, E_1)$, $G_2 = (V_2, E_2)$, the two graphs being tested. $M$ is the mapping matrix $M$ previously described. $H$ is a sorted list of the not yet bound nodes of the smaller graph $G_1$.
Output: true if the graphs are found to be isomorphic or false otherwise.
DFSGSIC($M$, $G_1$, $G_2$, $H$)

(1)     S = CREATESTATE($M$, $H$)
(2)     $h(S)$ = LENGTH($H$)
(3)     INITPQUEUE($Q$)
(4)     ADDTOPQUEUE($Q$, $S$, $h(S)$)
(5)     while NOTEMPTY($Q$)
(6)         S = REMOVEMIN($Q$)
(7)         M = GETM(S)
(8)         H = GETH(S)
(9)         forall $v_2$ in $V_2$ do
(10)            if $M[H[h(S) - 1], v_2] = 1$
(11)               Mnew = BIND($H[h(S) - 1]$, $M$, $v_2$)
(12)               if REFINE2($Mnew$, $G_1$, $G_2$, $Hnew$) = 0
(13)                   DO NOTHING
(14)               else
(15)                   if LENGTH(Hnew) = 0
(16)                       return true
(17)                   else
(18)                       Snew = CREATESTATE($Mnew$, $Hnew$)
(19)                       $h(Snew)$ = LENGTH($Hnew$)
(20)                       ADDTOPQUEUE($Q$, $Snew$, $h(Snew)$)
(21)     return false

FIG. 7

Input: $G_1 = (V_1, E_1)$, $G_2 = (V_2, E_2)$ the two graphs being tested. $P$ is the number of moves to make on a plateau before giving up.
Output: $H = 0$ if the LCS is found to correspond to a subgraph isomorphism. Otherwise, $H$ is returned where $H$ is the number of mismatched edges when the algorithm halts.
LCSGRADIENTDESCENT($G_1$, $G_2$, $P$)
(1)    Pairings = GETRANDOMPAIRINGS($G_1$, $G_2$)
(2)    $i = 0$
(3)    BestResult = $H(G_1, G_2,$ Pairings)
(4)    while (BestResult > 0) ∧ ($i<P$)
(5)        if $H(G_1, G_2,$ APPLYSWAP(Pairings,BestSwap)) < BestResult
(7)            Pairings APPLYSWAP(Pairings,BestSwap)
(8)            $i = 0$
(9)            BestResult = $H(G_1, G_2,$ Pairings)
(10)    else
(11)        if $H(G_1, G_2,$ APPLYSWAP(Pairings,BestSwap)) = BestResult
(12)            Pairings = APPLYSWAP(Pairings,BestSwap)
(14)            $i = i + 1$
(15)        else
(16)            $i = P$
(17)    return BestResult

FIG. 8

Input: $G_1 = (V_1, E_1)$, $G_2 = (V_2, E_2)$ the two graphs being compared. $R$ is the number of restarts.
Output: $S = 0$ if the smaller of the two graphs is the largest common subgraph. Otherwise, $S$ is returned where $S$ is the smallest result of $R$ restarts of LCSGradientDescent divided by the number of edges in the smaller of the two input graphs.
SIMILARITY ($G_1$, $G_2$, $R$)
(1)    $i = 0$
(2)    if GSIC($G_1$, $G_2$)
(3)        return 0
(4)    BestResultThusFar = LCSGRADIENTDESCENT($G_1$, $G_2$, $P$)
(5)    while (BestResultThusFar
(6)        BestResultThusFar = min BestResultThusFar, LCSGRADIENTDESCENT($G_1$, $G_2$, $P$)}
(7)        $i = i + 1$
(8)    return $\dfrac{Best\,ResultThusFar}{\min\{|E_1|,|E_2|\}}$

FIG. 9

METHOD FOR COMPARING SOLID MODELS

CROSS-REFERENCE TO RELATED APPLICATIONS

This application claims the benefit of U.S. Provisional Application No. 60/380,109 filed May 6, 2002, entitled "Machining Feature-based Comparisons of Mechanical Parts", the subject matter of which is incorporated herein in its entirety.

STATEMENT REGARDING FEDERALLY SPONSORED RESEARCH OR DEVELOPMENT

This invention was made with government support under National Science Foundation (NSF) Knowledge and Distributed Intelligence in the Information Age (KDI) Initiative Grant CISE/IIS-9873005; CAREER Award CISE/IIS-9733545 and Grant ENG/DMI-9713718; and award N00014-01-1-0618 from the Office of Naval Research. The Government has certain rights in this invention.

BACKGROUND OF THE INVENTION

Solid models are the critical data elements in modern Computer-Aided Design (CAD) environments, describing the shape and form of parts and assemblies. Increasingly, manufacturing enterprises maintain vast databases (also known as knowledge-bases) of Computer-Aided Design information as well as computer aided manufacturing (CAM) and Computer-Aided Process Planning (CAPP) information associated with the solid models. Such information includes, in addition to the solid models of the parts and assemblies, numeric control (NC) machining programs, production plans and cost data associated with manufacturing the parts and assemblies.

CAD, CAM and CAPP information of previously designed parts and assemblies is useful for process planning and cost estimation of new parts. Such information is generally sought based on perceived similarity of shape and/or structure and/or manufacturing process. However, many existing database systems storing solid models index the solid models based only on simple properties that have little to do with the structure or shape of the part, i.e. part name, designer's name, bills of materials etc. and do not use content and shape-based analysis of the solid models to index the solid models.

Databases of solid models that do make use of high-level content based analysis of the models typically rely on a system of manual classification such as group technology (GT) coding. However, GT coding requires that human observers examine each model in the database and relate each respective model to other models in the database. The task of manual coding is error prone and subject to the personal judgment of the observer. Further, GT coding is a pre-digital process and difficult to automate.

Generally, commercial computer-aided design (CAD) systems use a feature-based design approach to solid modeling. A feature history of a solid model typically includes the addition and subtraction of primitive shape components forming incremental versions of the solid model. Even surface shaping, free-form surface shaping, and deformation operations are internally represented in CAD systems as features in the feature history that generates the final design. CAM and CAPP systems also use feature based approaches to describe the manufacturing and assembly of an artifact.

The feature history of a given solid model's design might be ordered in a number of ways, depending upon the approach of the designer, and still result in the same final geometry and topology. Similarly, manufacturing features may be ordered in any number of alternate ways. However, for retrieval of solid models having prescribed features from a knowledge-base, it is desirable that the bases for retrieval be independent of the order of the features in the feature history.

The size of the knowledge-bases storing solid models and associated information is expected to be quite large, requiring an efficient means for storing and retrieving information from the knowledge-base. Desirably, the means for storing and retrieving the information should also provide for retrieving a solid models having a range of features.

Consequently, it is apparent that a need exists for an automatic method of retrieving solid models which are stored in a knowledge base, based on the shape and structural properties of the solid model. Further it is desirable that the bases for retrieval of the solid models be independent of the specific order of operations used for creating the object. Also, it is apparent that a need exists for a method of characterizing the solid models in such a way that the solid models in the knowledge-base may be indexed in order to accurately and efficiently maintain knowledge-bases of solid models and to facilitate efficient retrieval of solid models from the knowledge-bases.

BRIEF SUMMARY OF THE INVENTION

A preferred embodiment of the present invention is a method for determining a similarity of a first solid model to a second solid model. The method comprises the steps of: selecting a set of features for representing the first solid model; extracting features corresponding to the selected set of features from the first solid model; constructing an undirected model dependency graph of the first solid model based on the selected set of features; extracting features corresponding to the selected set of features from the second solid model; constructing an undirected model dependency graph of the second solid model based on the selected set of features; comparing the undirected model dependency graph of the first solid model with the undirected model dependency graph of the second solid model; and outputting a numerical measure indicative of the similarity of the first solid model to the second solid model.

Another embodiment of the present invention is a method of identifying at least one solid model in a knowledge-base storing a plurality of solid models having a predetermined similarity to a query model. The method comprises the steps of: selecting a set of features for representing the query model; extracting features corresponding to the selected set of features from the query model; constructing an undirected model dependency graph of the query model based on the selected set of features; comparing the undirected model dependency graph of the query model with an undirected model dependency graph of at least one of the plurality of solid models; computing a numerical measure indicative of the similarity of the query model to the at least one of the plurality of solid models; and identifying the at least one solid model having the predetermined similarity based upon the numerical measure of similarity being within a predetermined range.

A further embodiment of the present invention is a method of partitioning a plurality of solid models stored in a knowledge base comprising the steps of: selecting a set of features for representing a first solid model; extracting features corresponding to the selected set of features from the first solid model; constructing an undirected model dependency graph of the first solid model based on the selected set of features; extracting features corresponding to the selected set of features from each of the plurality of solid models; constructing an undirected model dependency graph of each of the plurality of solid models based on the selected set of features; comparing the undirected model dependency graph of the first solid model with the undirected model dependency graph of each of the plurality of solid models; computing a numerical measure indicative of the similarity of the first solid model to each of the plurality of solid models; and partitioning the plurality of solid models based on the similarity measure.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown. In the drawings:

FIG. 4 is a portion of pseudocode for determining if the undirected model dependency graphs corresponding to the first solid model and the second solid model are subgraph isomorphic according to the well known algorithm of Ullmann;

FIG. 5 is another portion of pseudocode for determining if the undirected model dependency graphs corresponding to the first solid model and the second solid model are subgraph isomorphic according to the well known algorithm of Ullmann;

FIG. 6 is a portion of pseudocode for determining if the undirected model dependency graphs corresponding to the first solid model and the second solid model are subgraph isomorphic according to a preferred algorithm;

FIG. 7 is another portion of pseudocode for determining if the undirected model dependency graphs corresponding to the first solid model and the second solid model are subgraph isomorphic according to the preferred algorithm;

FIG. 8 is pseudocode for determining the large enough common subgraph of the undirected model dependency graphs of the first solid model and the second solid model according to the preferred algorithm;

FIG. 9 is pseudocode for determining the similarity of the first solid model and the second solid model according to the preferred embodiment.

DETAILED DESCRIPTION OF THE INVENTION

Figure 1:
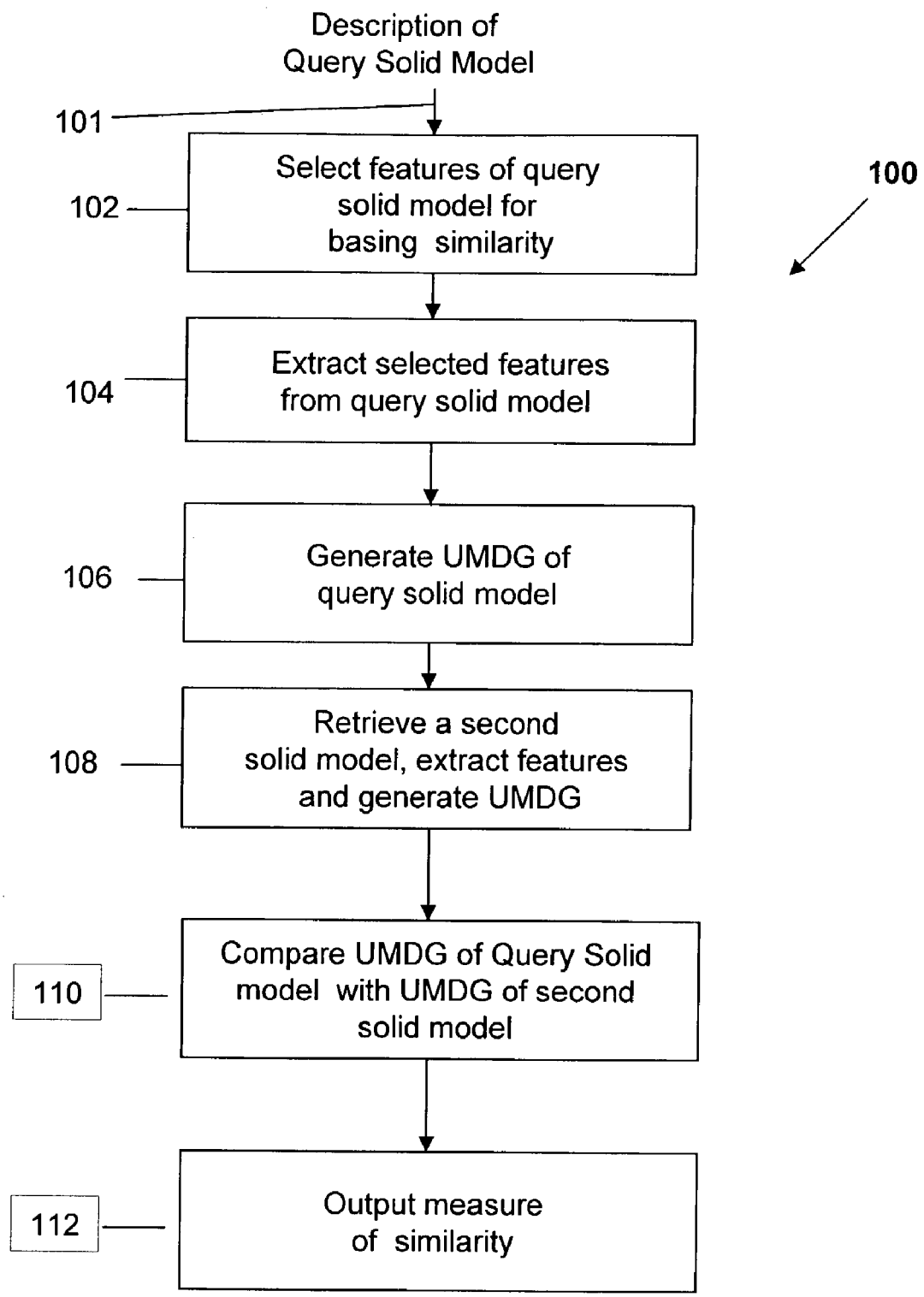
FIG. 1 is a block diagram of a process for determining a measure of similarity between a first solid model and a second solid model in accordance with a preferred embodiment of the present invention.

Referring to the drawings, wherein like numerals are used to indicate like elements throughout the several figures and the use of the indefinite article "a" may indicate a quantity of one, or more than one, of an element, there is shown in FIG. 1 a block diagram of a preferred process 100 for determining a similarity between first and second solid models.

Referring now to FIG. 1, process 100 begins with retrieving a solid model description 101 of the first solid model, hereinafter called a query model. As used in this application, a solid model is a representation of an artifact based on constructive solid geometry (CSG), boundary representation (BRep), or a similar technique. Such solid model description 101 of an artifact may exist within a knowledge base or may be a new description which is generated by the user for purposes of query and may or may not be later entered into the knowledge-base. Such knowledge-base may be located within a single storage device, dispersed on any number of storage devices located within close proximity to each other, such as in a single computer system, or dispersed on remote storage devices such that intercommunication between the storage devices would be via an intranet or internet communications media. As would be understood by those skilled in the art, the solid models stored in a knowledge-base or used for query may be represented in a variety of data formats such as the well known .dgn, and .dfx/.dwg formats. The present invention is not limited to the solid model being represented in any particular data format.

Preferably, the solid model description 101 includes information describing how to manufacture the artifact corresponding to the solid model. Preferably, the query model 101 includes features such as those describing the shape, form, and topology of the object as well as a description of the manufacturing process for building the artifact. Such information is referred to herein as manufacturing features. The query model 101 may also include assembly/mating features and those interactions between features which influence process plans and the selection of machining operations and fixtures. Additionally, the query model may include the feature space of available manufacturing operations.

Depending on the user, different features of an object may be of interest. In step 102, specific features or sets of features from the query model 101 may be selected by a user according to a predetermined similarity criteria. For example, if a user is interested in machining or CAD/CAM, machining features are selected. If the user is interested in assembly planning, assembly/mating features would be selected. If the user is interested in topology matching, features describing the faces of the artifact would be selected. The selection process would normally be conducted by the user entering the selected features via keyboard or mouse input to a computer. Such input could use any of the variety of computer input techniques such as query based or form based data input.

At step 104, the selected set of features are extracted from the query model 101. Preferably, the features are extracted by a feature recognizer which automatically recognizes the selected features such as shape, form and manufacturing process information contained in the query model description 101. Desirably, the recognizer also recognizes feature interactions and the feature space of available manufacturing operations.

The preferred embodiment employs a commercially available feature recognizer manufactured by Honeywell, Inc. called Feature Based Machining Husk (FBMach), to extract the selected features using automatic recognition, interactive recognition and manual identification. The output of the FBMach recognizer is in a format conforming to the Standard for the Exchange of Product Model Data (STEP), application protocol (AP) 224. The present invention is not limited to using the FBMach feature recognizer or of having the output in STEP AP 224 format. Other feature recognizers capable of extracting selected features from solid models could be used within the spirit and scope of the invention.

At step 106, an undirected model dependency graph (UMDG) is constructed of the query model. Preferably, the UMDG is an undirected graph having nodes corresponding to the features selected in step 102, edges connecting the nodes corresponding to the interdependency of the selected features and a structure independent of the ordering of the features. In the preferred embodiment, the UMDG, G=(V, E), for a solid model, is defined as a set of nodes G={$f_o, \ldots f_n$}, where the fi are the features that have been extracted from the model and the edge set E of the UMDG is defined as: E={($f_i, f_j$) such that vol($f_i$)∩vol($f_j$)≠0}. While it is preferred that the interdependency of the selected features represented in the edge set E are based on the intersection of the features, the interdepencies could also be based on other factors, such as the proximity of one feature to another or the absence of a certain feature.

Figure 2A:
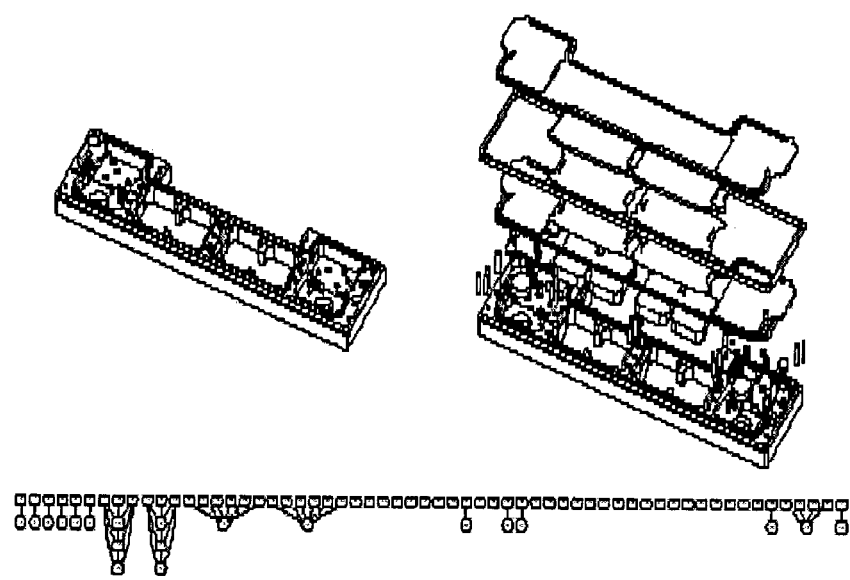
FIG. 2a is a diagram of an undirected model dependency graph of a bracket.
Figure 2B:
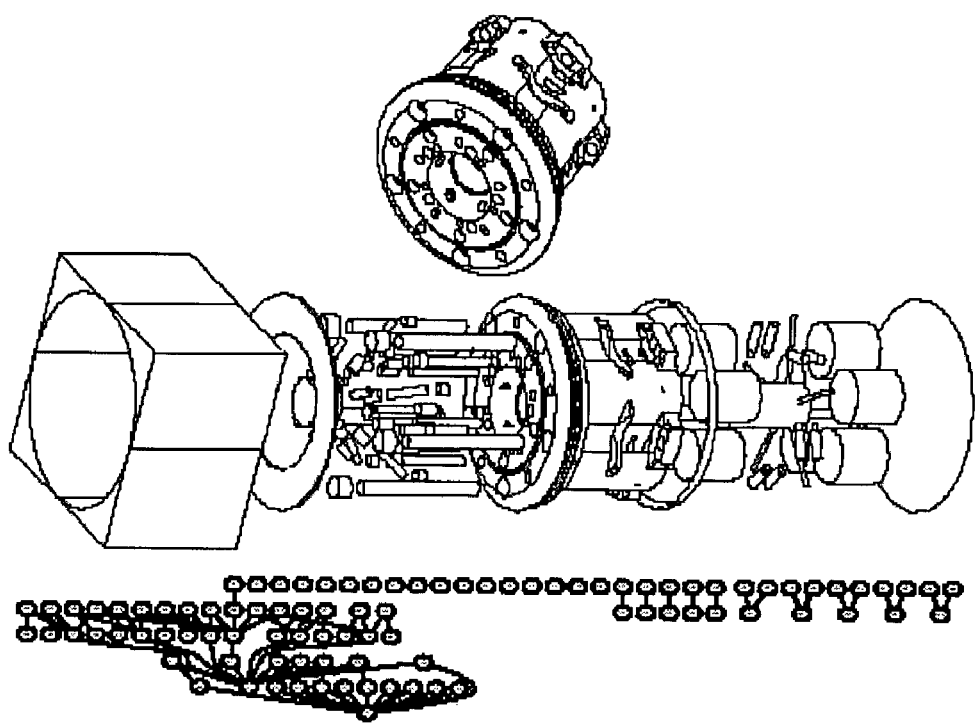
FIG. 2b is a diagram of an undirected model dependency graph of a torpedo motor.

FIG. 2(*a*) illustrates the UMDG and its generation from a solid model of a bracket. FIG. 2*a* shows the bracket itself along with the STEP AP 224 manufacturing features that have been extracted using FBMach. For each of the manufacturing features of the bracket, a node is added to the UMDG that is labeled with attributes of the feature such as its type and dimensions. For each pair of nodes, an edge is added if the two nodes interact (i.e., have a non-empty intersection of the feature volumes). FIG. 2(*b*) similarly illustrates the UMDG and its generation from the solid model of a torpedo motor.

Preferably, at the conclusion of constructing the UMDG of the query model, the UMDG is stored in the knowledge-base in association with the solid model. As would be clear, if a query model is selected from the knowledge-base with a UMDG already constructed for the selected features, steps 104 and 106 are skipped.

At step 108 a second solid model is retrieved from the knowledge-base. Preferably, the second solid model is stored in the knowledge-base with one or more UMDGs, where each UMDG corresponds to a predetermined set of features. Preferably, the features from which at least one of the UMDGs was generated correspond to the selected features of the query model. If a corresponding UMDG is not found, the selected features are extracted from the second solid model using the procedures of step 104 and a UMDG of the second solid model is constructed based on the selected features using the procedures of step 106. Alternatively, the second solid model may be manually entered by the user. Accordingly, the features selected at step 102 would be extracted from the solid model (step 104) and a UMDG of the second solid model would be constructed using the procedures of step 106.

Figure 2C:
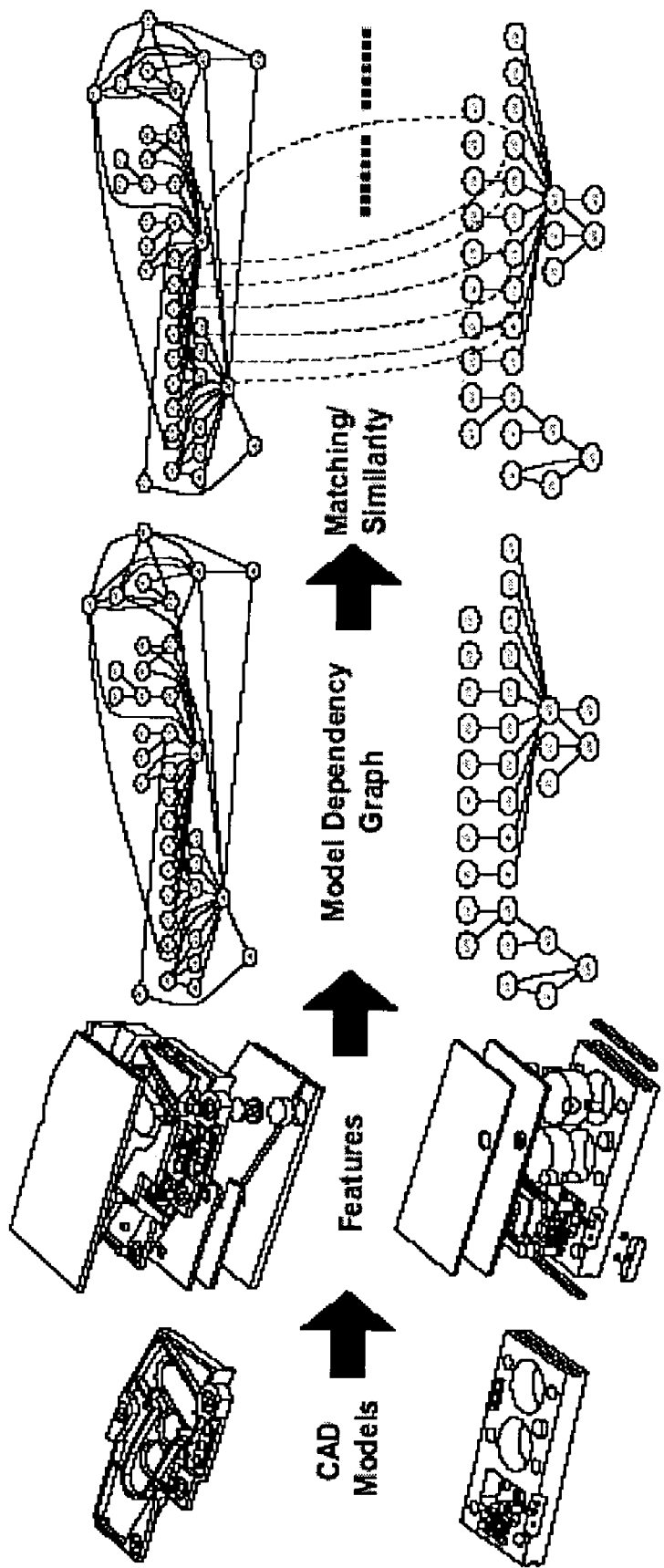
FIG. 2c is a diagram illustrative of the process for determining the measure of similarity between the first solid model and the second solid model.

At step 110, the UMDGs of the query model and of the second solid model are compared to determine the similarity of the solid models. At step 112, a numerical measure is computed indicative of the similarity of the query model and the second solid model. FIG. 2*c* illustrates the process of extracting features from the query model description 101 and a second solid model (step 104), constructing an undirected model dependency graph of each solid model (step 106) and comparing the UMDGs of the solid models (step 110). Steps 110 and 112 are described in more detail below.

Ideally, the percentage of mismatched edges between the query model and the second model are determined by finding the largest common subgraph (LCS) of the UMDGs of the query model and the second solid model. As understood by those skilled in the art, the LCS is found from a subgraph of one or the other of the query model and the second model when: (1) the respective subgraphs of the UMDGs of the query model and the second solid model are isomorphic with respect to each other and (2) the subgraphs are the largest possible subgraphs of the respective UMDGs in terms of the total number of edges of the subgraphs.

As well known to those skilled in the art, the LCS is NP-hard and a method for computing the LCS in polynomial time is not likely to exist. Accordingly, in the preferred embodiment, if the LCS of the UMDGs is not found, a best match or "large enough" common subgraph (LECS) is sought.

Figure 3:
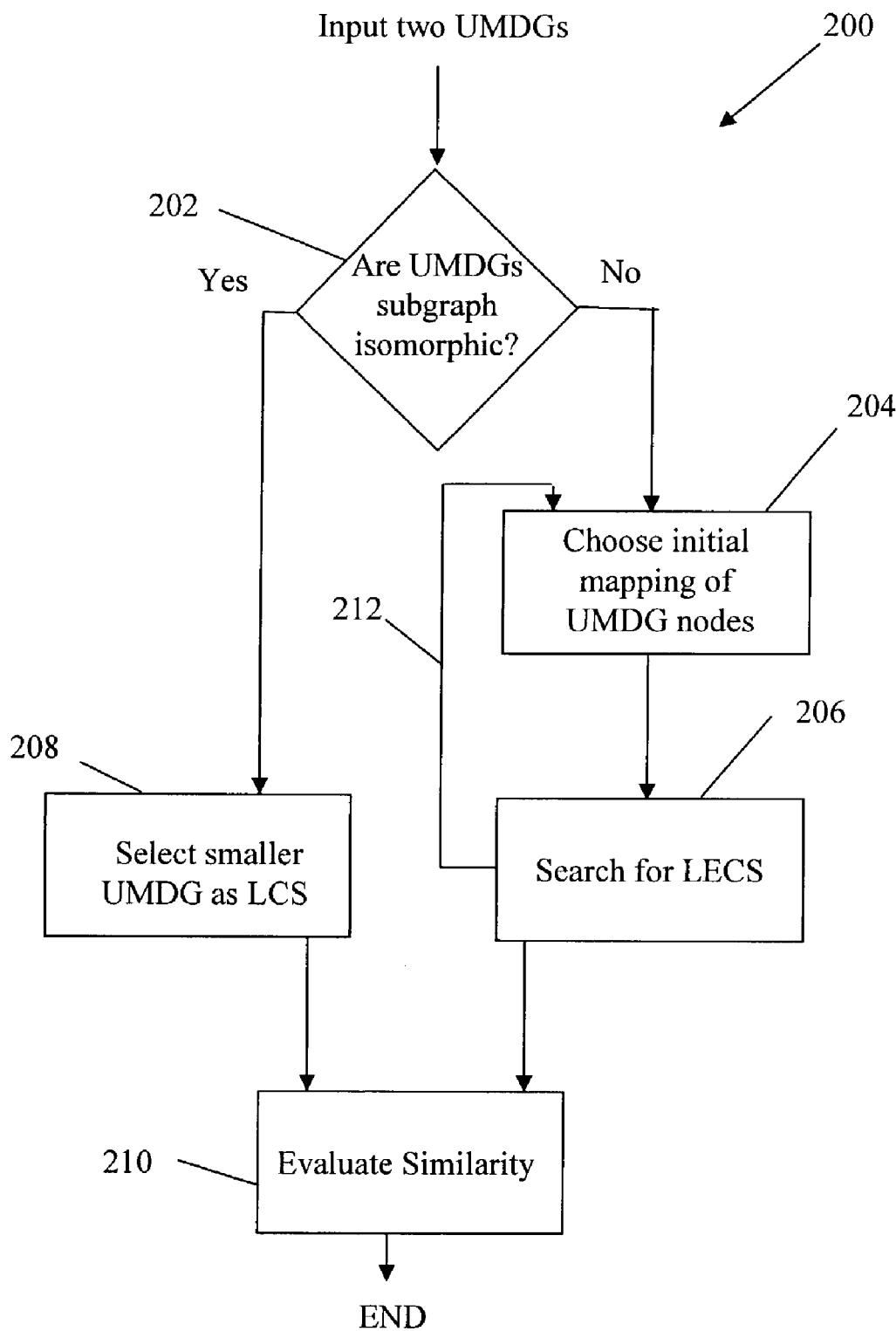
FIG. 3 is a flow diagram of a process for comparing the undirected model dependency graphs of the first solid model and the second solid model in accordance with the preferred embodiment.

Referring now to FIG. 3, there is shown a process 200 for searching for the LCS of the UMDGs of the query model and the second solid model. First, an algorithm for the subgraph isomorphism problem is applied to the pair of UMDGs. If a subgraph isomorphism is found, implying that the smaller UMDG, in its entirety, is isomorphic to some subgraph of the larger, then this implies that said smaller UMDG is the LCS of the pair of UMDGs. Otherwise, an LECS of the UMDGs of the query model and the second solid model is sought.

At step 202 the UMDGs are tested to determine if there exists a subgraph isomorphism. Two UMDGs are subgraph isomorphic if the smaller of the UMDGs is found to be isomorphic to some subgraph of the larger. In the preferred embodiment, a modification of Ullmann's well known algorithm (described below) is employed for determining subgraph isomorphism.

Ullmann's algorithm for subgraph isomorphism, shown in FIGS. 4 and 5, employs a depth first tree (DFS) search. Each state in the search space is represented by a matrix M. The M matrix is n×m where there n nodes in the smaller graph, and m nodes in the larger graph. The matrix elements $m_{ij}$ are "0" if the corresponding nodes may not be mapped to each other in any isomorphism and "1" otherwise. The initial state is generated based on the degrees of the nodes. In order to handle labeled graphs the labels are incorporated into the initialization stage. That is, if the labels of node i are inconsistent with those of node j of graph $G_2$, the $m_{ij}$ is initialized to "0". Otherwise, if the degree of node i of graph $G_1$ (the smaller graph) is greater than the degree of node j then $m_{ij}$ initialized to "0". If both of these conditions are false $m_{ij}$ is initialized to "1".

Ullmann's algorithm then proceeds depth-first. Each successor state binds a node mapping by setting all but one "1" in a row of the matrix M to "0". The bindings are considered in order of non-increasing node degree (see line 5 of FIG. 4). After this binding is performed, an arc consistency check is applied iteratively to each remaining "1" in the matrix M. This check is referred to as Ullmann's neighborhood consistency check. For each $m_{ij}$=1 in M, a check is made to ensure that for all neighbors x of i in Graph $G_1$, there must exist a neighbor y of j in Graph $G_2$ such that $m_{xy}$=1. If this condition does not hold, then $m_{ij}$ is changed to "0". This neighborhood consistency check is performed by the calls to "REFINE" in line 2 of FIG. 4 and line 4 of FIG. 5. "REFINE" returns false if there exists an all zero row in M after the neighborhood consistency check is performed and true otherwise. An all zero row implies that no subgraph isomorphism is consistent with the matrix M. If each row of M has exactly one "1" and all columns of M have no more than one "1" and if the neighborhood consistency check does not alter M, then M represents a subgraph isomorphism. The worst case complexity of Ullmann's algorithm is exponential. This occurs if all or a large number of the elements of the matrix are "1s" and if the refinement procedure fails to reduce the search space.

FIGS. 6 and 7 describe the preferred embodiment for testing for isomorphism. In the preferred embodiment, the process for initialization of Ullmann's matrix M is modified. Ullmann's algorithm initializes the matrix M solely on the basis of the degrees of the nodes and the labels of the nodes. The preferred method initializes M based on n-region density. The n-region density of a node corresponds to the number of nodes reachable from along a path no longer than n. If the graphs are of the same size and isomorphism is being tested then for all n=1, 2, ... N−1, the n-region density must be the same for any two nodes that are mapped to each other. Further, for subgraph isomorphism testing, a node in the larger graph must have at least as many nodes in n-region density as does the node in the smaller graph to which it is mapped for all n=1, 2, ... N−1. The n-region density for n and for all nodes of a graph may be calculated in time $O(N^3)$, where N is the number of nodes in the graph, using a calculation of "all pairs shortest paths". Also incorporated into the initialization stage is the sum of the degrees of the adjacent nodes of a node. For isomorphism testing this value must be equal and for subgraph isomorphism testing this value for a node in the smaller graph must be no larger than that of a node in the larger graph to which it is mapped. This preferred initialization stage is referenced in line 1 of FIG. 6.

A further modification to the algorithm of Ullmann is the use of a greedy heuristic choice within the depth-first search procedure. FIG. 7 shows this modification. Rather than arbitrarily choosing a node binding, the preferred method chooses a node binding that produces the matrix M with the fewest unbound nodes which can be accomplished with the use of a priority queue of M matrices. To calculate the heuristic, the refinement procedure Ullmann's algorithm is modified such that both refinement and the heuristic are computed simultaneously. The fourth parameter of the calls to "REFINE2" in line 12 of FIG. 7 and line 2 of FIG. 6 is an output parameter that contains a list of not yet bound nodes of graph $G_1$.

Referring again to FIG. 3, if subgraph isomorphism is found at step 202, the smaller UMDG is selected as the LCS of the UMDGs of the query solid model and the second solid model (step 208). If no subgraph isomorphism of the UMDGs of the query solid model and the second model is found at step 202, the LECS is determined at step 204 and step 206. At step 204 an initial mapping between the nodes of the UMDGs of the query model, $G_1$ and the second solid model, $G_2$ is selected such that for each node of $G_1$, a random node of $G_2$ is chosen such that no two nodes of $G_1$ are mapped to the same node of $G_2$. Step 206, described at FIG. 8, iteratively swaps the mappings of the nodes of $G_1$ and $G_2$ to reduce the value of an evaluation function. If there is no swap that reduces the value of the evaluation function, but there are swaps that result in the same value (i.e., a plateau has been reached), a swap is chosen at random. Step 206 ends when either every possible swap increases the value of the evaluation function or P random moves are made on the plateau. Step 204 and step 206 can then be iterated (path 212) some number of times in search of an even better solution.

The evaluation function used to determine when to terminate step 206 is based on the number of mismatched edges of the subgraphs. In the preferred embodiment, the evaluation function $H=|E|$ such that $G_1=(V_1, E_1)$ is the smaller of the two graphs being compared, $G_2=(V_2, E_2)$ is the larger of the two graphs, $E=\{(u,v) \in E_1$ such that $(((paired(u), paired(v)) \notin E_2 \hat{\,} (paired(v), paired(u)) \notin E_2)) \vee$ inconsistent(u, paired(u)) $\vee$ inconsistent(v, paired(v)). The function paired(x) above returns the node $y \in V_2$ to which the node $x \in V_1$ is currently mapped. The predicate inconsistent(x, y) is true if nodes x and y are inconsistent in terms of their labeled attributes and false otherwise. Preferably, node consistency is based only on the type of features the nodes represent. Additionally, consistency can include domain knowledge such as tolerances, manufacturing attributes, surface finish specifications, etc. While it is preferred that consistency is based on types of features, other criteria for consistency can be used.

The pseudocode of FIG. 8 describes the steps for computing the largest common subgraph using iterative improvement. In FIG. 8, "Pairing" refers to the mapping between the nodes of the two graphs. "GETRANDOMPAIRINGS" returns a random mapping as described above. H is the evaluation function that counts the number of mismatched edges given two graphs and a mapping between the nodes in these two graphs. "BestSwap" is the swap from the set of all possible swaps between pairings that results in a mapping with the smallest value for H. "APPLYSWAP" returns the mapping that results from applying the given swap to the given mapping. The algorithm is of polynomial time complexity. It takes $O(N^2)$ time to choose the best swap. In the worst possible case, by choosing the best swap at each step the evaluation function is simply reduced by one and therefore can look for the best swap as many as |E| times. It takes time in $O(|E|)$ to compute the evaluation function. Also in this worst case, the algorithm reaches a plateau as often as possible and takes random moves on each of these plateau before finding the swap that reduces the evaluation function. Therefore the worst case complexity of the algorithm is $O(P \cdot E^2 + P \cdot E \cdot N^2)$. If P is a constant, then the complexity is simply $O(E^2 + E \cdot N^2)$. This complexity is greatest when a graph is fully connected, making the first term redundant, and thus can be further simplified to $O(E \cdot N^2)$.

The node labeled attributes may contain as little or as much information as one chooses. For instance, the labeled attributes may be simply of the type of feature such as "hole" or "pocket". However, by incorporating more information into the node labels such as dimensions or orientation, the allowable mappings can be further restricted, thus increasing the performance of the method by reducing the search space. Incorporating more information in the node labels also obtains a more meaningful similarity measure. For example, by incorporating a notion of dimension into the labels, a large block with a tiny hole will not be found similar to a little block with a larger hole.

The numerical measure of similarity between the query model and the second model is determined at step 210. The preferred embodiment employs a numerical measure of similarity H* which is a ratio of mismatched edges to total edges in the smaller of the UMDGs being compared. More specifically value of $$H* = \frac{\min(H_1, \ldots H_n)}{|E_1|},$$

where $H_1, \ldots H_n$ are the final values of H from up to n random restarts of the steps in FIGS. 8 and 9, and $E_1$ is the edge set of the smaller graph. A similarity measure of "0" implies that the smaller UMDG is subgraph isomorphic to the larger UMDG, or equivalently that the LECS is the smaller UMDG. The similarity measure may vary between "0" and "1" where "0" denotes most similar and "1" denotes least similar. As would be clear to one skilled in the art, the value of the numerical measure resulting from comparing the query model and the second model may be compared with one or more predetermined values in order to classify the second model into one of a plurality of predetermined categories.

To obtain the similarity measure, the smallest result of r executions of the algorithm of FIG. 8 is divided by the number of edges in the smaller of the graphs. FIG. 9 is the random restart algorithm for determining similarity. The worst case complexity is exponential due to the call to "GSIC" (see FIG. 6) at the start, but in practice this step is performed very quickly as discussed previously and the bulk of the computation time is spent in the restarts of the iterative improvement search. Alternatively, the potentially exponential time call to "GSIC" may be mitigated by keeping track of the number of backtracks in the "GSIC" steps and abandoning the "GSIC" call if some threshold number of backtracks is exceeded without determining whether or not a subgraph isomorphism exists. Depending on how such a threshold is set, it is possible to ensure an overall complexity for the similarity algorithm of $O(E \cdot N^2)$.

As would be appreciated by one skilled in the art, the method for determining the similarity of two solid models may be used determine the similarity of the query model with respect to each of a plurality of solid models. In this case, the UMDG of the query model would be compared with a UMDG of each of the plurality of solid models using the steps of process 200. Preferably, the output of step 112 would beta numerical value between "0" and "1" for each comparison. Based upon the numerical measure, each of the plurality of solid models could be classified or partitioned according to their similarity to the query model.

Figure 10:
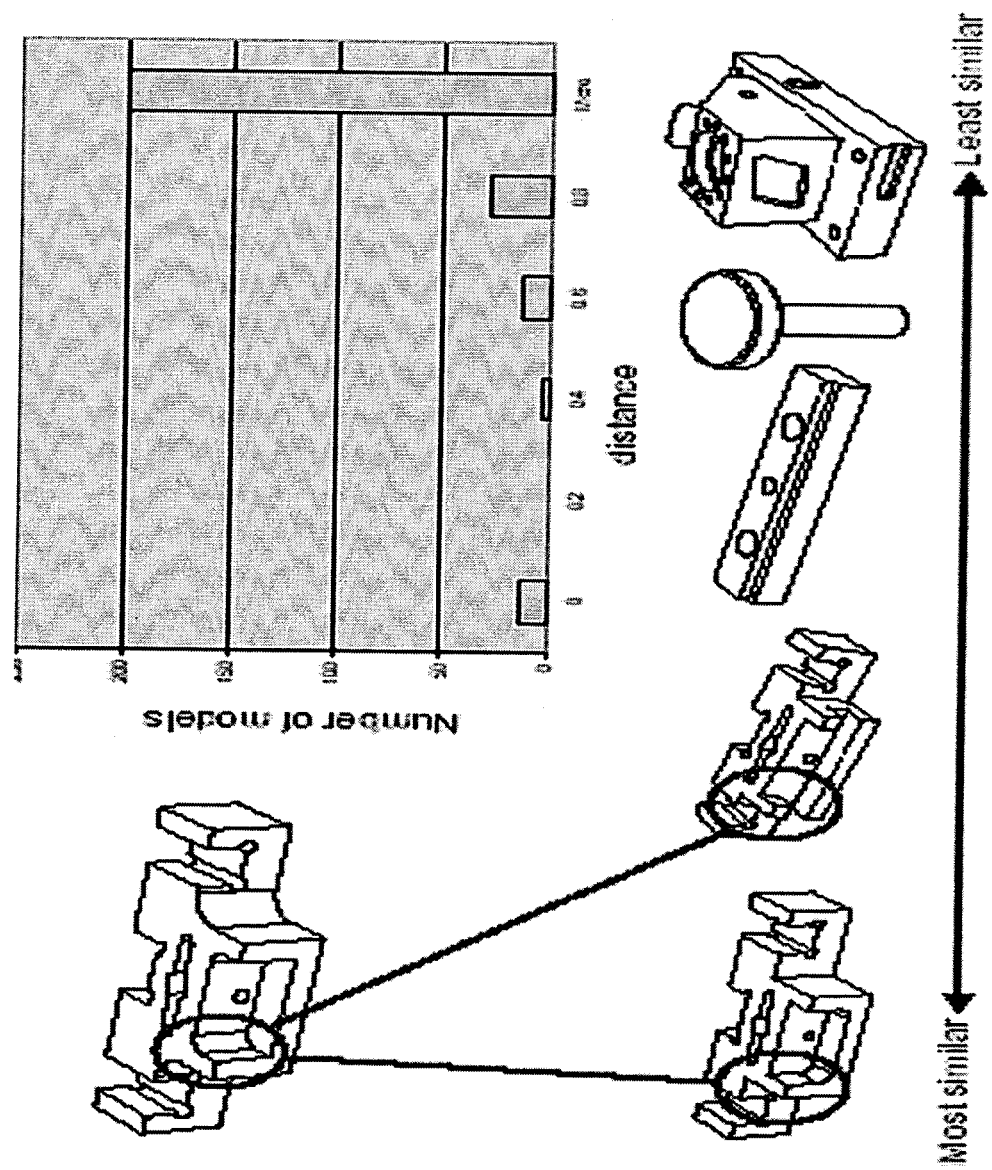
FIG. 10 is an example histogram of an output of the preferred embodiment.

FIG. 10 shows histograms of the results of comparing the UMDG of the query model (shown in the upper-left of FIG. 10) against the UMDGs of 259 solid models indexed by FBMach in a Knowledge-base. Reading the histogram from left-to-right, the parts on the left are more similar to the query and the parts in the right-most buckets are the least similar from a manufacturing standpoint. The distance between solid models is measured as the minimal percentage of mismatched edges as calculated over the course of several trials of process 200. Referring FIG. 10, the vertical axis (Y axis) is a count of the number of solid models falling into each one of the six buckets; the horizontal axis (X axis) is the percentage of mismatched UMDG edges (i.e., the ratio of mismatched edges to total number of edges in the smaller of the two UMDGs). For example, referring to FIG. 10 there were 5 models whose UMDGs exactly matched (or were embeddable in) that of the query model; 3 models with 20% or fewer mismatched edges; 5 models with 21%-to-40% mismatched edges; 15 with 41%-60% mismatches; 23 models with 61%-to-80%; and 208 models with greater than 80% mismatches. In this way, the histograms show a partition of the parts into groups based on the estimated distance between their UMDG and the UMDG of the query object.

A database of solid models indexed by their similarity to every solid model in the database may be constructed by computing the numerical measure of similarity of the query model relative to each solid model in the database and adding the resulting numerical measures of similarity to the database. A database of N solid models indexed by their similarity to every other solid model would require N(N−1)/2 storage locations to store the numerical measures of similarity. N similarity computations would be required to determine the similarity of the query model to each of the solid models in the existing database, and to add the query model to the database. Once stored within the database, N comparisons of the similarity measures associated with the query model would be required to identify the solid models in the database falling within a predetermined range of similarity to the query model.

In the preferred embodiment, the structure of the database for storing and locating the solid models is a tree which uses the numerical measure of similarity as an index. The tree has a root node, branches extending from the root node to child nodes also having branches, and leaves at the end points of the branches in which the solid models are stored. Preferably, when accessing the database for inserting a new solid model or for finding one or more solid models within a predetermined range of similarity to a query model, decisions are made at each node of the tree based on whether the measure of similarity, determined at each node by comparing the UDMG of the new or the query model, with the UDMG of the solid model represented by the node, are greater than or less than a predetermined value. Accordingly, the number of computations required to determine the similarity of the query model to each of the solid models in the existing database, and to add the query model to the database would approach log N if the tree were maintained in a balanced configuration. Preferably, an M-tree structure is used for storing and accessing the solid models. However, any type of tree structure in which the index can be based on a relative numerical similarity of the solid models, such as an M-tree structure, may be used. Other types of data structures suitable for creation of the index include b-trees, kd-trees, and r-trees as well as hash tables, heaps and lists.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A method of identifying at least one solid model having a predetermined similarity to a query model in a knowledge-base storing a plurality of solid models, the method comprising the steps of:

comparing an undirected model dependency graph of the query model constructed from a set of features including one or more manufacturing features selected from the group consisting of a shape, a topology, a form, features of a manufacturing process, assembly/mating features, interactions between features which influence process plans and selection of machining operations, and fixtures and feature space of manufacturing operations, with an undirected model dependency graph of at least one of the plurality of solid models constructed from a set of features including one or more manufacturing features selected from the group consisting of a shape, a topology, a form, features of manufacturing process, assembly/mating features, interactions between features which influence process plans and selection of machining operations, and fixtures and feature space of manufacturing operations, to test for the existence of a subgraph isomorphism between the undirected model dependency graphs of the query model and the at least one of the plurality of solid models using Ullmann's algorithm for subgraph isomorphism with a matrix employed by the Ullmann's algorithm being initialized based on an n-region density of nodes in the matrix;

if at least one subgraph isomorphism is found in said comparing step, identifying at least one solid model having the subgraph isomorphism; and if no subgraph isomorphism is found in said comparing step, identifying a one model having a large enough common subgraph of the undirected model dependency graph.

2. The method of claim 1, wherein the numerical measure is based on a ratio of mismatched edges to total edges of the smaller of the undirected model dependency graphs being compared.

3. The method of claim 1, wherein the knowledge-base is indexed by the relative similarity of each of the plurality of solid models to each other, the comparing step comprising the steps of:
identifying a group of solid models in said knowledge-base using the indexing of relative similarity; and
comparing the undirected model dependency graph of the query model with the undirected model dependency graph of each of the identified group of solid models.

4. The method of claim 1, wherein the knowledge-base is indexed with a tree having a root node and child nodes, the comparing step comprising the steps of:
comparing the undirected model dependency graph of the query model with an undirected model dependency graph of a solid model associated with the root node;
computing the numerical measure of similarity of the query model relative to the solid model associated with the root node;
selecting a branch of the root node based on the outcome of comparing the numerical measure of similarity with a predetermined value; and
repeating the comparing, computing and selecting steps with each subsequent child node of the root node until a leaf is reached.

5. The method of claim 1, wherein the step of extracting features comprises extracting features using a feature recognizer.

6. The method of claim 5, wherein said extracted features are STEP AP 224 NC features and wherein the feature recognizer is a FBMach feature recognizer.

7. The method of claim 1, wherein the Ullman's algorithm of the comparing step utilizes a depth-first search procedure with a greedy heuristic choice.

8. The method of claim 7, wherein the greedy heuristic choice chooses a node binding that produces a matrix with a fewest number of unbound nodes.

9. The method of claim 8, wherein a priority queue of a plurality of matrices is used to choose the node binding that produces a matrix with the fewest number of unbound nodes.

10. The method of claim 9, wherein a refinement procedure of the Ullmann's algorithm computes a refinement and a heuristic simultaneously.

11. The method of claim 1, wherein the undirected model dependency graphs comprise nodes corresponding to the selected features, edges connecting the nodes, said edges corresponding to an interdependency of the selected features, and a structure independent of an ordering of the selected features.

12. A tangible computer-readable medium having recorded thereon computer-readable instructions for performing the method of claim 1.

13. The method of claim 1, wherein the undirected model dependency graph of the query model is constructed by a method comprising the steps of:
selecting a set of features for representing the query model, wherein said features include one or more manufacturing features selected from the group consisting of a shape, a topology, a form, features of a manufacturing process, assembly/mating features, interactions between features which influence process plans and selection of machining operations, and fixtures and feature space of manufacturing operations;
extracting features corresponding to the selected set of features from the query model; and
constructing an undirected model dependency graph of the query model based on the extracted features.

14. The method of claim 13, wherein the undirected model dependency graph of the at least one solid model is constructed by a method comprising the steps of:
extracting features corresponding to the selected set of features from each said at least one solid model, wherein said features include one or more manufacturing features selected from the group consisting of a shape, a topology, a form, features of a manufacturing process, assembly/mating features, interactions between features which influence process plans and selection of machining operations, and fixtures and feature space of manufacturing operations; and
constructing an undirected model dependency graph of each said at least one solid model based on the extracted features.

15. A method of partitioning a plurality of solid models stored in a knowledge base comprising the steps of:
comparing the undirected model dependency graph of the first solid model constructed from a set of features including one or more manufacturing features selected from the group consisting of a shape, a topology, a form, features of a manufacturing process, assembly/mating features, interactions between features which influence process plans and selection of machining operations, and fixtures and feature space of manufacturing operations, with an undirected model dependency graph of each of the plurality of solid models constructed from a set of features including one or more manufacturing features selected from the group consisting of a shape, a topology, a form, features of a manufacturing process, assembly/mating features, interactions between features which influence process plans and selection of machining operations, and fixtures and feature space of manufacturing operations, to test for the existence of a subgraph isomorphism between the undirected model dependency graphs of the query model and the at least one of the plurality of solid models using Ullmann's algorithm for subgraph isomorphism with a matrix employed by the Ullmann's algorithm being initialized based on an n-region density of nodes in the matrix;
if at least one subgraph isomorphism is found in said comparing step, partitioning the plurality of solid models based on the at least one subgraph isomorphism;
if no subgraph isomorphism is found in said comparing step, identifying a solid model having a large enough common subgraph of the undirected model dependency graph; and
partitioning the plurality of solid models based on the identified solid model having a large enough common subgraph.

16. The method of claim 15, wherein the Ullmann's algorithm of the comparing step utilizes a depth-first search procedure with a greedy heuristic choice.

17. The method of claim 16, wherein the greedy heuristic choice chooses a node binding that produces a matrix with a fewest number of unbound nodes.

18. The method of claim 17, wherein a priority queue of a plurality of matrices is used to choose the node binding that produces a matrix with the fewest number of unbound nodes.

19. The method of claim 18, wherein a refinement procedure of the Ullmann's algorithm computes a refinement and a heuristic simultaneously.

20. The method of claim 15, wherein the undirected model dependency graphs comprise nodes corresponding to the selected features, edges connecting the nodes, said edges corresponding to an interdependency of the selected features, and a structure independent of an ordering of the selected features.

21. A tangible computer-readable medium having recorded thereon computer-readable instructions for performing the method of claim 15.

22. The method of claim 15, wherein the undirected model dependency graph of the query model is constructed by a method comprising the steps of:

selecting a set of features for representing the query model, wherein said features include one or more manufacturing features selected from the group consisting of a shape, a topology, a form, features of a manufacturing process, assembly/mating features, interactions between features which influence process plans and selection of machining operations, and fixtures and feature space of manufacturing operations;

extracting features corresponding to the selected set of features from the query model; and constructing an undirected model dependency graph of the query model based on the extracted features.

23. The method of claim 22, wherein the undirected model dependency graphs of the plurality of solid models are constructed by a method comprising the steps of:

extracting features corresponding to the selected set of features from each of the plurality of solid models, wherein said features include one or more manufacturing features selected from the group consisting of a shape, a topology, a form, features of a manufacturing process, assembly/mating features, interactions between features which influence process plans and selection of machining operations, and fixtures and feature space of manufacturing operations; and constructing undirected model dependency graphs of each of the plurality of solid models based on the extracted features.

* * * * *